United States Patent [19]

Norbeck

[11] 4,259,845

[45] Apr. 7, 1981

[54] LOGIC CONTROL SYSTEM FOR INVERTER-DRIVEN MOTOR

[75] Inventor: Dean K. Norbeck, York, Pa.

[73] Assignee: Borg-Warner Corporation, Chicago, Ill.

[21] Appl. No.: 75,043

[22] Filed: Sep. 12, 1979

[30] Foreign Application Priority Data

Feb. 8, 1979 [JP] Japan ................................. 54-14020

[51] Int. Cl.³ .......................... G05B 5/00; H02P 5/28; F25B 1/00
[52] U.S. Cl. ....................................... 62/209; 62/228; 318/334; 318/806; 318/808
[58] Field of Search ............... 318/334, 779, 806, 808; 62/209, 228 B

[56] References Cited

U.S. PATENT DOCUMENTS

| | | | |
|---|---|---|---|
| 3,355,906 | 12/1967 | Newton | 62/209 |
| 4,048,554 | 9/1977 | Stich | 318/808 X |
| 4,151,725 | 5/1979 | Kountz et al. | 62/182 |

Primary Examiner—William E. Wayner
Attorney, Agent, or Firm—James J. Jennings, Jr.

[57] ABSTRACT

The logic control system of the invention regulates the frequency of operation of an inverter which drives an electric motor, and also regulates the level of the d-c bus voltage supplied to the inverter. This is accomplished by sensing the level of the bus voltage and the level of the current supplied to the motor, and comparing the sensed values to a reference or set point signal. The motor drives a compressor, and a capacity control system cooperates with the logic control system in the regulation of the compressor. The capacity control system provides signals, such as start/stop and inverter set point, to the logic control system to assist in regulating operation of the inverter which drives the compressor. In particular the logic control system includes a reference conductor on which a basic reference control signal is developed for use in controlling both the amplitude and the frequency of the a-c energy supplied by the inverter to the motor.

23 Claims, 5 Drawing Figures

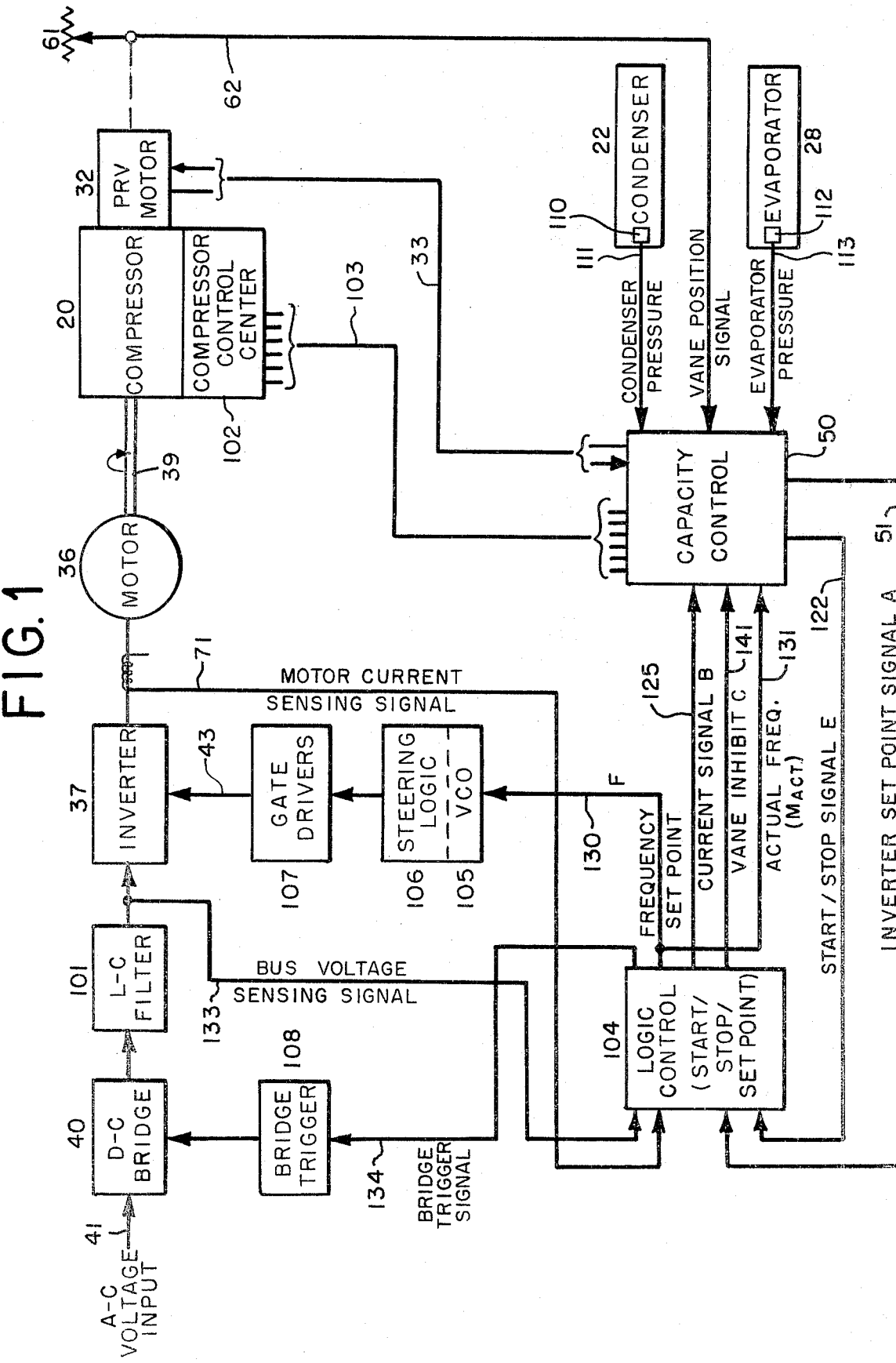

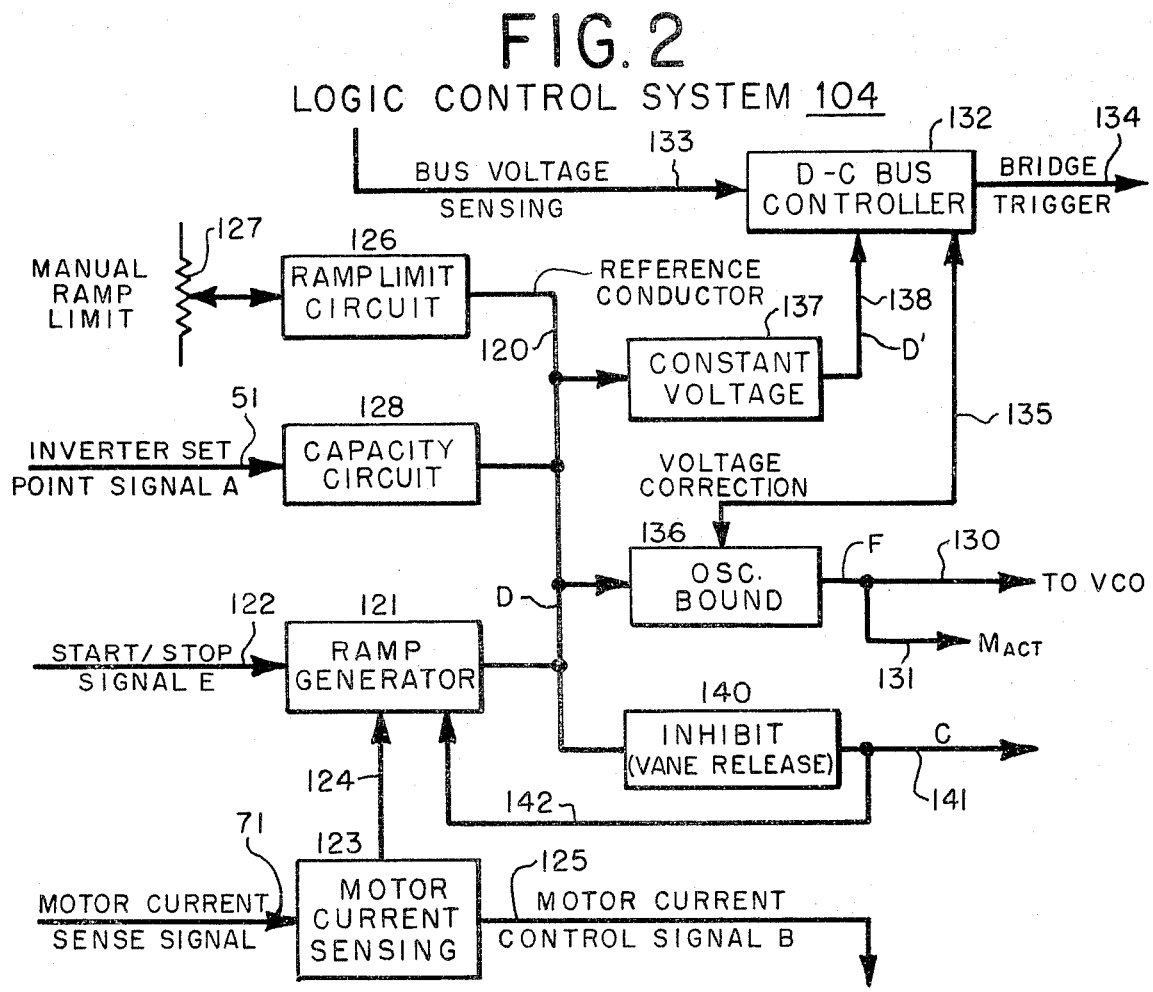
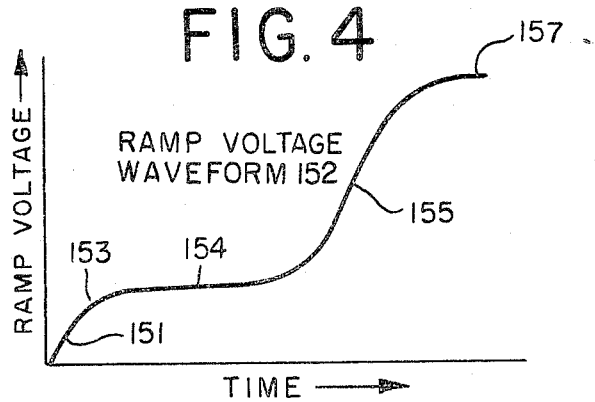
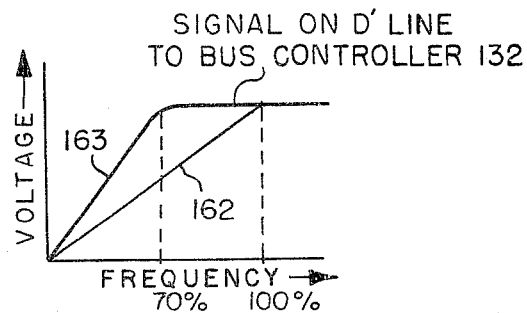

LOGIC CONTROL SYSTEM FOR INVERTER-DRIVEN MOTOR

BACKGROUND OF THE INVENTION

Different control arrangements have been developed for regulating operation of an inverter coupled to an electric motor. By regulating the frequency and amplitude of the inverter output voltage, the motor operating characteristics (such as speed, torque and horsepower) can be correspondingly regulated. Certain operating environments pose difficult problems, especially in regulating system start-up when a large induction motor is driven by the inverter, and in correcting the bus voltage supplied to the inverter to compensate for changes in inverter operating frequency. Such problems have been encountered, for example, in a refrigeration system including a centrigual compressor with adjustable guide vanes, of the type shown generally in FIG. 1 of U.S. Pat. No. 4,151,725, entitled "Control System for Regulating Large Capacity Rotating Machinery", which issued May 1, 1979 to the assignee of the present invention. The teaching of that patent was principally directed to the capacity control system 50. There remained problems in conjunction with the logic control system as noted above, and it is to the solution of these problems that the present invention is particularly directed.

It is a principal object of the present invention to provide a logic control system for an inverter-driven motor of large capacity, effective to obtain precise start-up of the system and subsequent accurate regulation of the system operation.

Another important object of the invention is the provision of means for operating the inverter at a certain minimum frequency during system start-up, and thereafter bringing the inverter operating frequency smoothly up to its normal value.

Still another important object of the present invention is the provision of a logic control system suitable for interaction with a capacity control system of the type disclosed in U.S. Pat. No. 4,151,725, regulating not only the inverter-driven motor but also the adjustable inlet guide vanes of the compressor.

SUMMARY OF THE INVENTION

The logic control system of this invention is useful with an inverter connected to drive an electric motor which in turn drives a load. The inverter provides a-c energy over an output line to the motor upon receipt of d-c energy over a d-c bus.

The logic control system comprises a reference conductor on which a reference control signal is developed for use in regulating both the level of d-c energy on the d-c bus and the frequency of the a-c energy provided by the inverter. A ramp generator circuit is coupled to the reference conductor, for providing a gradually increasing output signal during system start-up to function as the reference signal. A capacity circuit has an output portion coupled to the reference conductor, and an input portion connected to receive a signal varying as a function of the inverter operating frequency. The output portion includes components connected such that the reference control signal developed on the reference conductor is the lower (in amplitude) of the output signals from the ramp generator circuit and the capacity circuit.

The logic control system is particularly useful with a refrigeration arrangement including a compressor, a condenser and an evaporator, all connected in a closed refrigeration circuit. The compressor has adjustable inlet guide vanes, or prerotation vanes, and a PRV adjusting motor is connected to adjust the position of these vanes. The logic control system, in conjunction with a capacity control system, regulates operation of the electrical and mechanical components of the refrigeration arrangement and the electrical drive system.

THE DRAWINGS

In the several figures of the drawings, like reference numerals identify like components, and in those drawings:

FIG. 1 is a block diagram depicting the incorporation of the logic control system of this invention in a larger refrigeration system;

FIG. 2 is a block diagram depicting sub-systems with the logic control system;

FIGS. 4 and 5 are graphical representations useful in understanding the operation of the logic control system of the invention.

DETAILED DESCRIPTION OF THE INVENTION

Figure 3:
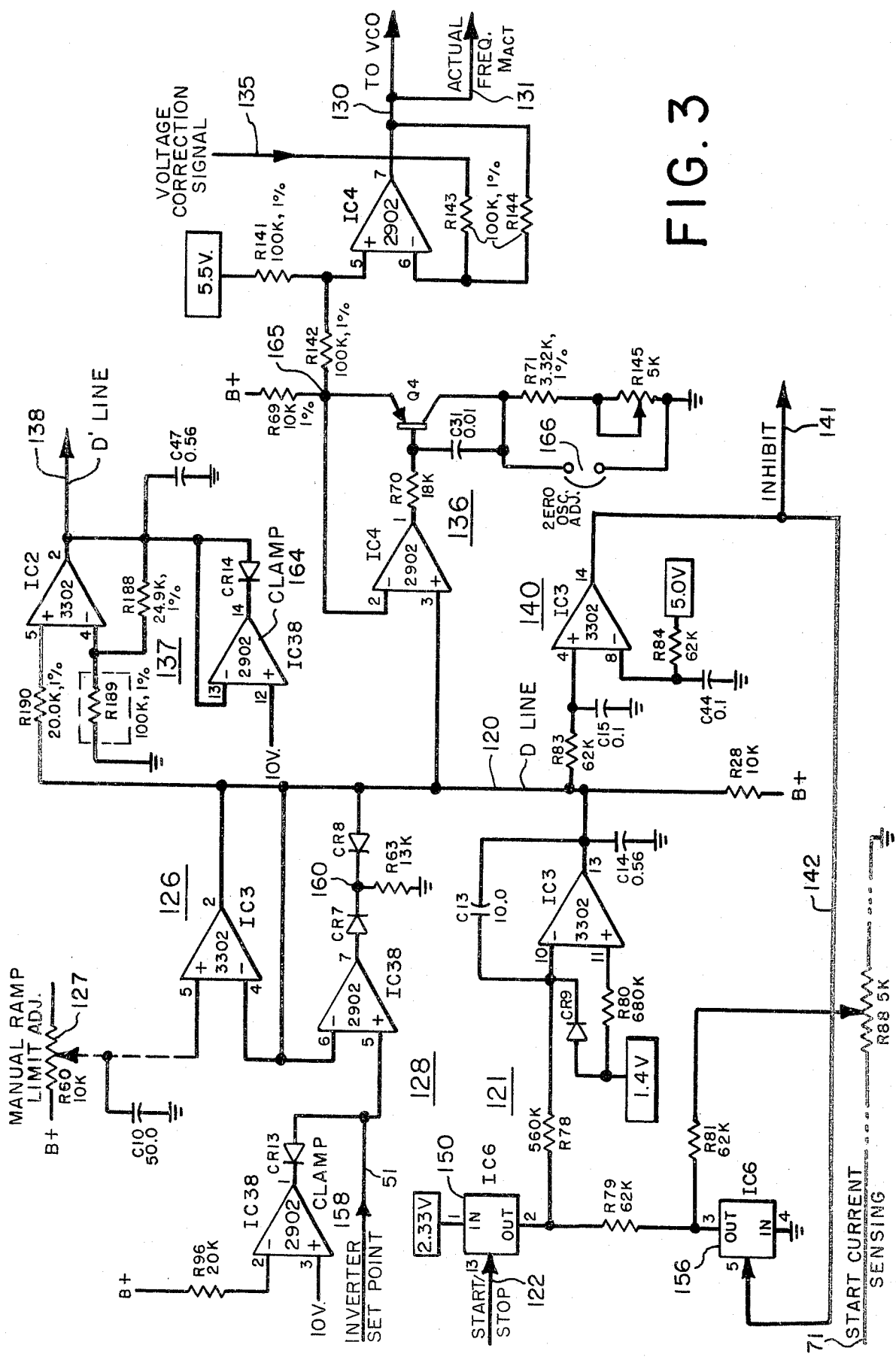
FIG. 3 is a schematic diagram setting out circuit details of the logic control system.

FIG. 1 shows a cooling system in which an electrical prime mover 36 is coupled over a shaft 39 to drive a compressor 20. These components, and the other components with reference numerals under 100, are also shown in FIG. 1 of U.S. Pat. No. 4,151,725. The main energy flow is from left to right in the upper portion of FIG. 1, from input line 41 through d-c bridge 40, LC filter 101, and inverter 37 to motor 36, which can be a common induction motor. The cooling circuit details between compressor 20, condenser 22, and evaporator 28 are not shown, because they are well known and understood. Control of the compressor 20 and the adjustable inlet vanes (through PRV motor 32) is regulated from capacity control system 50, described in detail in the '725 patent. The capacity control system 50 is interfaced with a compressor control center 102 located with the compressor, over a plurality of electrical conductors gathered within a cable 103.

In accordance with this invention, capacity control system 50 also receives control signals from logic control system 104. Additionally the logic control system of this invention regulates the inverter frequency through a voltage controlled oscillator (VCO) 105, a steering logic stage 106, and a gate driver circuit 107. In the earlier '725 patent, the logic stage 44 embraced the functions shown in the separate stages 104–107 in FIG. 1 of the present application. Logic control system 104 also regulates operation of a bridge trigger circuit 108, to correspondingly regulate d-c bridge 40 and control the level of the d-c voltage supplied over the d-c bus to inverter 37.

The compressor head value $\Omega$ is calculated in capacity control circuit 50 by operating upon signals derived from pressure transducers. A first pressure transducer 110 is mounted in the condenser, providing a signal on line 111 which is a function of the absolute pressure in the condenser, and a second transducer 112 is positioned in the evaporator, providing a signal on line 113 which is a function of the absolute pressure in the evaporator. These two signals are utilized in capacity control system 50 to develop a control signal which uniquely defines the compressor head and enhances the operating efficiency of the system, even at lighter loads and at a low head. This is accomplished by substracting the evaporator pressure signal Pev from the condenser pressure signal Pcd, and dividing the result by the evaporator pressure signal Pev. This system is substituted for the head calculation method described in the '725 patent, which was thermistors 56, 58 as shown in FIGS. 1 and 5 of that reference. By replacing those thermistors in FIG. 5 with pressure transducers 110 and 112, and using the expression (Pcd−Pev)/Pev on line 89 to represent the minimum mach number $M_o$ for wide open vanes, the teachings of FIG. 5 in the '725 patent adequately describe capacity control system 50 shown in FIG. 1 of this application. Hence the logic control system of this invention will now be described.

FIG. 2 shows the major sub-systems of the logic control system 104 of this invention. Although the complete system shown in FIG. 1 includes a compressor, it is manifest that the logic control system is useful with any inverter-driven motor in which the inverter voltage amplitude and frequency are controlled, irrespective of the load driven by the elctric motor. In general the inverter operating frequency and voltage amplitude are controlled from logic control system 104 shown in FIG. 2, and more particularly from reference conductor 120. It will become apparent that a reference control signal is developed on this conductor (also termed the D line) for use in regulating both the level of the d-c voltage on the bus to the inverter, and the frequency of the a-c voltage at the output side of the inverter.

An important component of the system in FIG. 2 is a ramp generator circuit 121, coupled to reference conductor 120. It is this circuit which provides a gradually increasing output signal during system start-up to function as the reference control signal on conductor 120. Operation of circuit 121 is initiated upon receipt of a start signal over line 122 from the capacity control system, which indicates completion of the start sequence in the capacity control system. A motor current sensing circuit 123 is connected to supply a modifying signal over line 124 to ramp generator circuit 121. This modifying signal is a function of the level of current supplied to motor 36, and enables the ramp generator circuit to modify its gradually increasing output signal as the level of the motor current changes during start-up. Circuit 123 also provides a current control signal over line 125 to the capacity control system. Additionally the reference control signal on conductor 120 is affected by ramp limit circuit 126, which includes a component such as potentiometer 127 which is manually adjustable to limit the amplitude of the reference control signal developed on reference conductor 120.

One additional circuit, capacity circuit 128, affects the amplitude of the reference control signal on conductor 120. The input portion of this circuit is connected over conductor 51 to receive a signal which varies as a function of the inverter operating frequency. Although shown as derived from capacity control system 50 in FIG. 1, it could of course be derived from the conductor 130 in FIGS. 1 and 2, which passes the frequency set point signal to the voltage controlled oscillator 105. Such a signal could also be derived from conductor 131, which provides the actual frequency signal Mact to the capacity control system. Capacity circuit 128 has an output portion, which will be explained in connection with FIG. 3, coupled to reference conductor 120 and including components connected such that the amplitude of the reference control signal on line 120 is the lower of the output signal from ramp generator circuit 121 and capacity circuit 128. The importance of this interaction will become apparent from the subsequent explanation.

Logic control system 104 also includes a d-c bus controller 132 which receives a bus voltage sensing signal over line 133 from the d-c bus, and provides an output bridge trigger signal over line 134 to bridge trigger circuit 108. Controller stage 132 also provides a voltage correction signal over line 135 to an oscillator bound circuit 136, shown coupled to reference conductor 12 at its input side. The oscillator bound circuit is so named because it establishes a lower limit or boundary for the reference control signal developed on conductor 120, when modified within circuit 136 and passed over line 130 to VCO 105. Constant voltage stage 137 is also coupled to reference conductor 120, and provides a modified output signal D' over line 138 to d-c bus controller 132, to effect a change in the d-c bus voltage in a manner different than that which would be provided if the control signal on line 120 were applied directly to controller 132.

An inhibit circuit 140 has its input portion coupled to reference conductor 120, and operates to provide a vane-release signal over line 141 to capacity control system 50 when the output signal from ramp generator circuit 121 reaches a predetermined level. A portion of the vane-release signal is fed back over line 142 to the ramp generator circuit, to prevent further application of the modifying signal over line 124 from motor current sensing circuit 123 after the ramp generator circuit output signal has reached the predetermined level at which the compressor vanes are released. With this broad perspective of the logic control system, a more detailed showing and explanation will now be set out.

Considering first the ramp generator circuit in the lower left portion of FIG. 3, initially there is no motor current and hence no current flow through R88. The "start" signal on line 122 is high, turning on transmission gate 150 and allowing the 2.33 volts to pass through this gate, and through R78 to the negative input of the 3302. The 1.4 volt signal is applied over R80 to the plus terminal of this 3302, and hence its output, the effective signal on line 120 at this time, is held at zero.

When the start signal is received over line 122 from the capacity control system, transmission gate 150 is turned off, and the node between resistors R78, R79 stabilizes at a voltage which depends in part upon the remainder of the resistive network including R81 and the effective portion of start current potentiometer R88. At this time the motor current is zero, and the voltage at the node of R78 and R79 is virtually zero. The voltage from the 1.4 volt connection provides some current flow through R78, R79, R81 and a portion of R88 to ground. With this constant voltage across the resistive chain, there is a constant current flow through capacitor C13 at this time. This current flow begins to charge the capacitor and form the initial portion 151 of the ramp function curve 152 in FIG. 4. When the ramp function reaches a point corresponding to a voltage of about 0.8 volt, the gates in inverter 37 (FIG. 1) are turned on. When this occurs the d-c bus voltage supplied to the inverter is about 50 volts. Under these conditions current begins to flow through motor 36, and even at the reduced bus voltage, the motor current approaches rated or full load current. A portion of this motor current flows through the start current potentiometer R88 in FIG. 3, developing a voltage at the end of R81 farther removed from R79. As this voltage increases, it reaches the 1.4 volt level at the other end of the resistive chain already described, and with equal voltages at both ends of R78, R79, and R81, current flow through these resistors ceases. As a consequence, the current flow in C13 also stops, and there is no increase in the amplitude of the ramp function signal as shown at point 153 in FIG. 4 at this time. This accounts for the horizontal intermediate portion 154 of this ramp curve. Thus there is a clear interaction between the moror current sensing stage and the ramp generator stage in regulating the closed loop control system shown in FIG. 1.

As the motor 36 comes up to synchronous speed, at the starting frequency, the inrush of current drops off to a low value, and the voltage at the wiper of the motor start current potentiometer R88 drops nearly to zero. This reestablishes current flow through the resistive chain including R78, R79 and R81, with a corresponding current flow in C13. This action continues the ramp generation and develops the portion referenced 155 in FIG. 4. When the voltage on line 120 reaches 5 volts, inhibit circuit 140 shown in FIG. 2 produces an output signal on line 141 to release the vanes, and also feeds back a portion of this signal over line 142 to the second transmission gate 156 in the ramp generator circuit of FIG. 3. This switches the second gate to the on condition, in effect grounding the node between R79 and R81. This insures that current flow will be maintained through R78 and R79, and therefore through C13, until the ramp reaches the upper limit or horizontal portion 157 shown in FIG. 4. Without the second transmission gate, there would be continuous interaction between the voltage developed on potentiometer R88 and the remainder of the ramp circuit, and the slope of the ramp generator could be flattened, or even go negative. Hence the switching of the second gate insures the complete and proper generation of the portion 155 of the ramp function. Absent other stages of the logic system, the ramp portion would continue up to the B+ voltage, 12 volts in the preferred embodiment. However, it will become apparent that the circuits shown to the left of line 120 in FIG. 3 are, in effect, connected in an analog OR arrangement. Accordingly, the regulation of the uppermost portion 157 of the ramp function does not depend only upon the ramp circuit, but upon other components as will now be described.

Capacity circuit 128 has an output portion comprising diodes CR7 and CR8, having their cathodes connected at a common point 160, and resistor R63 is coupled between common point 160 and ground. The anode of diode CR8 is coupled to reference conductor (D line) 120, and the anode of CR7 is coupled to the remainder of capacity circuit 128 at pin 7 of the 2902.

Considering the ramp voltage on line 120 is increasing and reaches approximately 9 volts, the 2902 op amp in circuit 128 coupled to the inverter set point signal conductor 51 is utilized, with the just-described output portion of this circuit, to limit the voltage on line 120 to 10 volts, notwithstanding the B+ voltage of 12 volts supplied over R28. As the system is starting up, it is likely the inverter set point signal will be at the maximum or 10 volts. The signal applied to the positive input of the 2902 is limited by the 2902 clamp stage 158, shown coupled to the cathode of diode CR13, the anode of which is connected to conductor 51. With 10 volts supplplied to its positive input and 9 volts (from reference conductor 120, or the D line) to its negative input, the 2902 shown coupled to diode CR7 attempts to drive its output as high as it can, toward 12 volts. This forward-biases diode CR7, which conducts and current flows through R63 to ground. The relatively high potential developed at the top of R63, between the cathodes of CR7 and CR8, reverse biases CR8 and it is non-conducting at this time. As the slope portion 155 of the ramp function shown in FIG. 4 continues upward toward 10 volts, the voltage at the minus input of the 2902 approaches the voltagbe (10 volts) at its plus input. When the voltage on the D line and negative input equals that on the plus input, the 2902 quickly switches and its output rapidly drops low. This action reverse biases CR7, the cathode of CR8 "sees" a voltage near ground, and CR8 becomes conductive. The voltage across R63 then changes, and CR7 again begins to conduct. This loop including the 2902, diodes CR7 and CR8, and R63, stabilizes the voltage on reference conductor 120 at about 10 volts, with the voltage at the top of R63 about 9.4 volts. The 2902 conducts just enough to maintain this voltage on the D line at 10 volts, and there is a delicate balance in this circuit which operates very effectively to regulate the voltage on the D line as described.

Assuming that the entire refrigeration system has cooled the space down and the inverter set point signal drops to a lower voltage, say 8 volts, diode CR7 is again reverse biased and diode CR8 conducts to pull down the voltage on the D line, as previously described. This occurs gradually and the loop, including the 2902 and the diodes CR7 and CR8, then stabilizes with 8 volts on the D line. If the inverter set point signal suddenly goes to 10 volts again, with 8 volts on the D line, the ramp circuit again provides a charging current through C13 to produce a gradual return to the 10 volt level. Thus the ramp circuit and the capacity control circuit are effectively intercoupled in an analog OR arrangement.

The 3302 coupled between the D line and manual ramp limit potentiometer R60 is also effectively "ORRED", with the capacity control circuit and the ramp generating circuit, to regulate the voltage on the D line. Capacitor C10 is made electrically large, 50 microfarads in a preferred embodiment, to prevent rapid transfer of a step-function type signal from potentiometer R60 to the D line.

In a control system such as shown in FIG. 1, it is desirable to limit the minimum speed of compressor operation, to insure that some oil will always be pumped in the system. Accordingly, the values of R28 and R63 are selected to prevent the pull-down of the voltage on the O line beyond a certain value even though a lower voltage may be present on conductor 51. The voltage divider circuit including R28, CR8, and R63 determines the minimum compressor speed and hence protects the system.

As noted above, the reference control signal developed on the D line 120 is utilized, in a general sense, for regulating both the level of the d-c bus voltage supplied to the inverter, and the frequency of the inverter a-c output voltage, by regulating the frequency of the pulses supplied over line 130 to the voltage controlled oscillator. In many systems it is desired to change the bus voltage and the operating frequency concomitantly, to maintain a constant voltage/frequency (v/f) ratio, and thus maintain a constant torque output for most electric motors. This constant v/f operation is depicted by curve 162 in FIG. 5, which shows a linear path in the voltage/frequency ratio between the start-up point (actually the minimum frequency established by oscillator bound circuit 136) and the maximum point, or 100% load condition. It has been found desirable to maintain the d-c bus at the 100% voltage level while the frequency is reduced as shown in curve 162, and then at approximately 70% of rated load, to begin reducing the d-c bus voltage as shown by curve 163. This prevents reduction of the voltage on the d-c bus, as the d-c bridge 40 (FIG. 1) is phased back, and thus prevents degrading the power factor exhibited by the system. Thus in a broad sense the constant voltage stage 137 (FIG. 2) is provided to increase the gain of the D' signal supplied to the d-c bus controller, as contrasted to the gain of the D signal supplied over line 130 to the voltage controlled oscillator, providing the improved power factor regulation just described.

To provide this higher gain, the 3302 is coupled over resistor R190 to the D line as shown at the top of FIG. 3. This amplifier provides the appropriate gain to produce the gain or slope of the curve 163 shown in FIG. 5. Resistor R189 is a component which can be simply removed, such as being clipped out by a wire cutter, to modify the operation of circuit 137 to produce on line 138 a voltage which is exactly that on line 120. That is, the 3302 and its associated circuit is modified to have a gain of unity when resistor 189 is removed, and this provides the constant v/f operation depicted by curve 162 in FIG. 5. Clamp 164 is another limit circuit, similar to clamp 158, to insure that the output signal on the D' line does not exceed 10 volts. However with resistor R189 in the circuit, the d-c bus voltage is maintained high from 70% load through 100% load, even though the frequency as determined by the signal on line 130 is reduced as shown by curve 162 in FIG. 5. This eliminates the poor power factor on the input to the inverter. Consequently there is a reduction in the actual power drawn from the utility, in that the induction motor can be run at a lower frequency with the resultant energy saving because of the system performance.

Turning now to the oscillator bound circuit 136, the 2902 PNP type transistor Q4, and the voltage divider comprising resistor R69, resistor R71 and the effective portion of trimmer resistor R145, cooperate to establish a lower limit on that portion of the D line signal which will be utilized to provide a frequency control signal over line 130 to the voltage controlled oscillator. By way of example, if the voltage on reference conductor 120 is initially zero, this low signal on the plus input, pin 3 of the 2902, drives the output voltage of this stage to ground, and this provides current flow through base resistor R70 to turn on transistor Q4 hard, driving it into saturation. Neglecting the saturation drop across the emitter-collector path of the transistor, the ratio of the resistors R69, R71 (and the effective portion of R145) determine the voltage established at point 165, which ultimately regulates the oscillator frequency (neglecting, for the moment, the voltage correction signal received over line 135). This voltage was adjusted to be approximately 3.33 volts in a preferred embodiment, so that at start-up the oscillator and the inverter are running at approximately ⅓ the normal frequency, or 20 hertz if it is a 60 hertz system. A push-button switch 166 is provided to effectively short R71 and R145, for providing a precise adjustment of the oscillator when the system is initially set up. Capacitor C31 provides stability in this voltage control circuit. The oscillator bound circuit as just described is sufficient to provide a frequency control voltage at point 165, which could be utilized directly and passed over line 130 to the voltage controlled oscillator.

As the voltage on reference conductor 120 comes up to the 3.33 volt level established at point 165, the output of the 2902 comes up from ground, and transistor Q4 drops out of saturation. The 2902 has a very high gain, and thereafter tends to balance the voltages at its plus and minus inputs, so that the voltage at the emitter of Q4 is just equal to the voltage at the plus input of the 2902. That is, transistor Q4 conducts just enough in the closed loop including the 2902 to maintain the oscillator-controlling signal at point 165 exactly equal to the voltage-amplitude controlling signal on D line 120.

Considering now the voltage correction circuit including the 2902, pins 5, 6 and 7, the plus input of this stage is connected to the common point between resistors R141 and R142. The 5.5 volt level applied to the top of R141 represents an artificial ground for this circuit. Hence the input or the signal at point 165 is effectively divided in half by the resistors R141 and R142, and the resultant signal applied to the plus input, pin 5 of the 2902. With the feedback resistor R144, this stage has a gain of two so that the net effect on its output line is substantially the same with respect to the signal level at point 165. In addition line 135 provides an input, over resistor R143, for a voltage correction signal derived from bus controller 132. This allows the voltage correction stage to provide small changes in the oscillator control voltage on line 130 to correspond with similar small changes in the d-c bus voltage. It is apparent that such an arrangement could be used to slave the oscillator control to the d-c bus level, and control the inverter frequency directly from the bus voltage, without any connection to the D line.

Inhibit circuit 140 includes a 3302 stage connected to provide a vane-release signal from the output conducter 141 when the level of the reference control signal on the D line reaches a predetermined level, for example, five volts. The level at which stage 3302 switches is determined by the reference voltage applied to its minus input, pin 8. In the preferred embodiment this was 5 volts so that, at this voltage level, the 3302 switches to provide the vane-release signal over line 141 to the capacity control system 50, allowing for release of the inlet guide vanes in compressor 20. At the same time a portion of this signal is fed back over line 142 to gate 156, effectively closing this gate and grounding the node between R79 and R81. This insures continued current flow through resistors R78 and R79, with a consequent flow through capacitor C13. As previously explained, this insures that the last portion 155 of the ramp voltage will be generated, without any interaction between the changes in motor current developed across R88 and the remainder of the ramp generator circuit 121.

TECHNICAL ADVANTAGES

The logic control system of the invention provides very effective control of an inverter-driven motor, and has additional refinements to utilize such a system in conjunction with a refrigeration compressor coupled to the motor. In particular, the interaction of the ramp generator circuit and the capacity circuit to provide the reference control signal on the D line is very important to the proper regulation of the amplitude of the voltage on the d-c bus, as well as the actual frequency of the inverter output voltage. The ramp circuit is only started, by a signal from the capacity system, after the normal start sequence has been completed by the capacity control circuit, and all the safeties, limit switches, and other sensors indicate the system is in fact ready for operation. Part way through the ramp signal generation, the inhibit stage operates to release the adjustable vanes, and insures—through a feedback signal—that the ramp generation will continue to the appropriate point. When the system is operating and the controlled space has been cooled down, the reduction in the level of the input signal to the capacity circuit operates, through the output portion of this circuit and the reference conductor, to provide on the D line a signal which appropriately lowers the voltage level on the d-c bus and the operating frequency. This assumes that the voltage level is to be lowered below the 70% load point, in view of the explanation given above for the constant voltage arrangement. If the system set point signal on line 51 is suddenly raised, there is a smooth increase in the reference control signal on the D line by the charging of capacitor C13. If the manual ramp limit adjust potentiometer is displaced suddenly, the electrically large capacitor C10 prevents the translation of a step-function signal rapidly through stage 126 to the reference conductor. Thus all the components are intercoupled in a manner to afford precise regulation without any rapid jumps in the reference control signal, which would not be compatible with the inertia developed in the large rotating machinery controlled by the system. In addition the combination of R28, R63 provides a lower limit on the compressor speed when the system is operating, to insure that the system cannot be cranked down below a safe minimum operating level.

The oscillator bound circuit insures that the system will be started at some minimum operating frequency, usually about ⅓ of the normal system operating frequency. In addition the oscillator bound circuit includes a provision for utilizing a voltage correction signal to modify the actual inverter operating frequency as a function of fluctuations in the d-c bus voltage. This is an important consideration to insure precise tracking of the voltage and frequency characteristics of the inverter output signal.

The term "conductor", as used herein and in the appended claims, refers not only to a conventional metal lead, but also to other items such as a simple spot of solder, a broad area of conductive material such as might be plated on a circuit board, or any other component which provides virtually zero resistance to a d-c signal. The term "connected" means a d-c connection between two those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A logic control system for an inverter connected to drive an electric motor which in turn drives a load, the inverter providing an a-c voltage over an output line to the motor upon receipt of a d-c voltage over a d-c bus, which logic control system comprises:

a reference conductor on which a reference control signal is developed for use in regulating both the level of d-c voltage on the d-c bus and the frequency of the a-c voltage provided by the inverter;

a ramp generator circuit coupled to the reference conductor, for providing a gradually increasing output signal during system start-up to function as the reference signal; and a capacity circuit, having an output portion coupled to the reference conductor and an input portion connected to receive a signal varying as a function of the inverter operating frequency, said output portion including components connected such that the reference control signal developed on the reference conductor is the lower of the output signals from the ramp generator circuit and the capacity circuit.

2. A logic control system as claimed in claim 1, and further comprising a motor current sensing circuit connected to supply a modifying signal to the ramp generator circuit, which modifying signal is a function of the level of current supplied to the electric motor, enabling the ramp generator circuit to modify its gradually increasing output signal as the level of the motor current changes.

3. A logic control system as claimed in claim 1, and further comprising a ramp limit circuit coupled to the reference conductor, and having a component manually adjustable to limit the amplitude of the signal developed on the reference conductor.

4. A logic control system as claimed in claim 3, in which the ramp limit circuit includes a capacitor having a pair of plates, one plate being coupled to ground and the other plate being coupled between the manually adjustable component and the reference conductor, to slow the transfer of a signal change from the adjustable component to the reference conductor.

5. A logic control system as claimed in claim 1, and further comprising an oscillator bound circuit coupled to the reference conductor, operative to establish a lower limit on that portion of the reference control signal which is used to regulate the frequency of the a-c voltage supplied by the inverter.

6. A logic control system as claimed in claim 5, and in which the oscillator bound circuit includes means for receiving a voltage correction signal which varies with variations in the amplitude of the bus voltage, thus modifying the frequency of the a-c voltage supplied by the inverter in accordance with variations in the amplitude of that a-c voltage.

7. A logic control system as claimed in claim 1, in which the cpacity circuit output portion comprises a pair of diodes each having an anode and a cathode, both cathodes being connected together at a common point, and a resistor coupled between the common point and ground, the anode of one diode being coupled to the reference conductor and the anode of the other diode being coupled to the remainder of the capacity circuit.

8. A logic control system as claimed in claim 1, in which the load is a refrigeration compressor, a capacity control system is intercoupled with the compressor and the logic control system, and in which the capacity control system provides a start signal to the ramp generator circuit upon completion of the start sequence during system start-up.

9. A logic control system as claimed in claim 8, in which the signal supplied to the capacity circuit and varying as a function of the inverter operating frequency is provided by the capacity control system.

10. A logic control system as claimed in claim 8, in which the compressor includes adjustable inlet vanes and in which an inhibit circuit is coupled to the reference conductor, for providing a vane-release signal to the capacity control system when the output signal from the ramp generator circuit reaches a predetermined level.

11. A logic control system as claimed in claim 10, in which a motor current sensing circuit is connected to supply to the ramp generator circuit a modifying signal which varies as a function of motor current amplitude, and in which a portion of the vane-release signal is fed back to the ramp generator circuit, to prevent further application of the modifying signal after the ramp generator circuit output signal has reached said predetermined level.

12. A logic control system as claimed in claim 8, in which the capacity circuit output portion includes a first resistor coupled between a common point and ground, and further comprising a second resistor coupled between a plane of reference voltage and the reference conductor, such that the first and second resistors comprise a voltage divider circuit which limits the minimum level of the reference control signal developed on the reference conductor notwithstanding the level of inverter operating frequency signal applied to the input portion of the capacity circuit, thus providing a corresponding minimum limit on the compressor speed.

13. A logic control system for a refrigeration arrangement including a compressor, a condenser and an evaporator, all connected in a closed refrigeration circuit, an electric motor connected to drive the compressor, an inverter connected to provide a-c voltage over an output line to the motor upon receipt of d-c voltage over a d-c bus, and a d-c bridge for receiving a-c voltage over an input line and supplying a d-c voltage to the d-c bus, which logic control system comprises:
  a reference conductor on which a reference control signal is developed for use in regulating both the level of d-c voltage provided by the d-c bridge on the d-c bus and the frequency of the a-c voltage provided by the inverter;
  a ramp generator circuit coupled to the reference conductor, for providing a gradually increasing output signal during system start-up to function as the reference control signal;
  a capacity control system, connected to calculate the compressor head and provide an inverter set point signal; and
  a capacity circuit, having an output portion coupled to the reference conductor and an input portion connected to receive the inverter set point signal, said output portion including components connected such that the reference control signal developed on the reference conductor is the lower of the output signals from the ramp generator circuit and the capacity circuit.

14. A logic control system as claimed in claim 13, and further comprising a motor current sensing circuit connected to supply a modifying signal to the ramp generator circuit, which modifying signal is a function of the level of actual current supplied to the electric motor, enabling the ramp generator circuit to modify its gradually increasing output signal as the level of the motor current changes.

15. A logic control system as claimed in claim 13, and further comprising a ramp limit circuit coupled to the reference conductor, and having a component manually adjustable to limit the amplitude of the signal developed on the reference conductor.

16. A logic control system as claimed in claim 15, in which the ramp limit circuit includes a capacitor having a pair of plates, one plate being coupled to ground and the other plate being coupled between the manually adjustable component and the reference conductor, to slow the transfer of a signal change from the adjustable component to the reference conductor.

17. A logic control system as claimed in claim 13, and further comprising an oscillator bound circuit coupled to the reference conductor, operative to establish a lower limit on that portion of the reference control signal which is used to regulate the frequency of the a-c voltage supplied by the inverter.

18. A logic control system as claimed in claim 17, and in which the oscillator bound circuit includes means for receiving a voltage correction signal which varies with variations in the amplitude of the bus voltage, thus modifying the frequency of the a-c voltage supplied by the inverter in accordance with variations in the amplitude of that a-c voltage.

19. A logic control system as claimed in claim 13, in which the capacity circuit output portion comprises a pair of diodes each having an anode and a cathode, both cathodes being connected together at a common point, and a resistor coupled between the common point and ground, the anode of one diode being coupled to the reference conductor and the anode of the other diode being coupled to the remainder of the capacity circuit.

20. A logic control system as claimed in claim 13, in which the capacity control system provides a start signal to the ramp generator circuit upon completion of the start sequence during system start-up.

21. A logic control system as claimed in claim 20, in which the compressor includes adjustable inlet vanes, and in which the logic control system includes an inhibit circuit coupled to the reference conductor, for providing a vane-release signal to the capacity control system when the output signal from the ramp generator circuit reaches a predetermined level.

22. A logic control system as claimed in claim 21, in which a motor current sensing circuit is connected to supply to the ramp generator circuit a modifying signal which varies as a function of motor current amplitude, and in which a portion of the vane-release signal is fed back to the ramp generator circuit, to prevent further application of the modifying signal after the ramp generator circuit output signal has reached said predetermined level.

23. A logic control system as claimed in claim 20, in which the capacity circuit output portion includes a first resistor coupled between a common point and ground, and further comprising a second resistor coupled between a plane of reference voltage and the reference conductor, such that the first and second resistors comprise a voltage divider circuit which limits the minimum level of the reference control signal developed on the reference conductor notwithstanding the level of the inverter set point signal applied to the input of the capacity circuit, thus providing a corresponding minimum limit on the compressor speed.

* * * * *